United States Patent Office 2,730,530
Patented Jan. 10, 1956

2,730,530

FATTY ACID ANHYDRIDES

John L. Ohlson and Charles W. Hoerr, Chicago, Ill., assignors to Swift & Company, Chicago, Ill., a corporation of Illinois No Drawing. Application April 22, 1952, Serial No. 283,764

10 Claims. (Cl. 260—346.8)

The present invention relates generally to a method for the preparation of acid anhydrides and more particularly to a method for the catalytic liquid phase dehydration of fatty acids, dicarboxylic acids, and the methyl and ethyl esters thereof to form corresponding acid anhydrides.

Heretofore the manufacture of acid anhydrides from fatty acids, dicarboxylic acids, and the like has been almost universally restricted to the conventional vapor phase, thermal decomposition processes involving the use of a variety of different catalysts, and relatively high operating temperatures.

The present invention has as its object, therefore, the provision of a method for the liquid phase preparation of acid anhydrides.

An additional object of the present invention is to provide a method for the liquid phase thermal decomposition of fatty acids, dicarboxylic acids, and the like at relatively low temperatures to form the corresponding acid anhydrides.

A further object of the invention is to provide a method for the liquid phase thermal decomposition of fatty acids, dicarboxylic acids, and the like to the corresponding acid anhydrides, using a catalyst which is relatively inexpensive and easily regenerated.

Additional objects if not specifically set forth herein will be readily apparent to one skilled in the art from the following detailed description of the invention.

Broadly, the present invention comprises a process for the thermal decomposition of the materials herein described in the presence of an "activated" alumina catalyst wherein sufficient pressure is employed on the reacting system to maintain the material in the liquid phase within the temperature range of about 150° C. to about 300° C., the specific temperature used depending on the particular acid employed. The process may include as starting materials all fatty acids having at least 3 carbon atoms as well as all dicarboxylic acids and mixtures thereof. Additionally, the methyl and ethyl esters of all these acids and mixtures thereof are capable of acting as starting materials for the process. Suitable starting materials include such acids as propionic, butyric, valeric, caproic, caprylic, capric, lauric, myristic, palmitic, stearic, arachidic, behenic, malonic, succinic, glutaric, adipic, pinelic, suberic, azelaic, and sebacic acids.

The method of the present invention may be carried out in several ways, for example, in a continuous manner utilizing a packed column operating under either atmospheric pressure or superatmospheric pressure depending on the particular material being treated, or in a batch process utilizing an autoclave or other container which may or may not be pressurized depending upon the material being processed.

A brief description of the procedure preferably followed when using a packed column for the continuous production of acid anhydrides from fatty acids according to the method of the present invention is set forth below. The batch process which may be carried out in an autoclave or the like will be readily ascertainable to one skilled in the art from the description of the continuous process.

A molten fatty acid containing more than 2 carbon atoms is introduced into the top of a heated column packed with pelleted or granulated "activated" alumina ($Al_2O_3$) catalyst. The temperature of the column is kept within the range 150° C. to 300° C. with the optimum temperature depending upon the particular acid being processed. The rate of throughput of the acid is regulated so that any given portion of acid is in contact with an excess of catalyst, the rate for a column containing 500 grams of catalyst being, for example, about 100–200 grams of fatty acid per hour. The anhydride produced by this method is recovered at the base of the column, the conversion being in general between 60–80 per cent of theoretical. The column may be heated by any suitable means, but an electric heating jacket has been found to be very suitable for this purpose.

In carrying out the process atmospheric pressure is in general sufficient to maintain any acid in the aliphatic series having more than 12 carbon atoms in the liquid phase within the operable temperature limits. However, when an acid in the aliphatic series having less than 12 carbon atoms is processed, it is generally necessary to impose superatmospheric pressure on the system in order to maintain the reactants in the liquid phase.

The catalyst used in the present invention is "activated" alumina. A preferred method for producing the catalyst comprises heating aluminum oxide trihydrate (about 30 per cent water content) to approximately 500° C. for several hours, forming pellets from the monohydrate thus produced, the pellets being preferably of about ⅛–¼ inch in diameter, for the specified column used herein and thereafter calcining the pellets at 600°–700° C. for a period of from 1 to 2 hours. The trihydrated alumina used in preparing the catalyst is obtained by acidifying an aqueous solution of sodium aluminate. A suitable granular "activated" alumina catalyst may be prepared by heating the monohydrate, prepared as above but granulated, to 600°–700° C. for several hours. This granular catalyst will produce results approximating those produced by the use of the preferred pelleted catalyst.

The "activated" alumina catalyst is distinctive in its ease of regeneration. When used in a heated packed column, as described above, the alumina catalyst continuously dehydrates itself as long as the temperature of the column remains elevated. Should the catalyst become too highly hydrated to function efficiently due to a drop in the operating temperature or to too rapid a throughput of the fatty acid, it can be readily dehydrated by maintaining the column temperature in the neighborhood of 350° C. for 2 to 4 hours. A further advantage of the catalyst used in the method of this invention is that it is very stable, only a negligible amount (0.05%) of the catalyst or less appearing in the treated product, thereby eliminating the necessity of subsequent treatment of the product to remove the catalyst therefrom.

The temperature useful in the present method for the preparation of acid anhydrides may vary within quite a wide range. The lower portion of the range specified herein as about 150° C. is not intended to be the lowest temperature at which the splitting-off of water will take place, but the reaction at lower temperatures than 150° C. is in general so slow as to be impractical for commercial purposes. Also the upper portion of the range is not a fixed point, although at unduly high temperatures the formation of ketones, as claimed and disclosed in the copending application of J. L. Ohlson and C. W. Hoerr, Serial No. 283,763, filed April 22, 1952, now Patent No. 2,697,729 becomes a competing reaction resulting in a decrease in the yield of anhydrides. Usually at temperatures substantially above 300° C., ketone formation is predominant. Therefore, for the preparation of anhydrides it is preferred that the temperature be maintained within the range of about 150°–300° C. The actual temperature used in each case will, of course, be dependent upon the particular acid being processed.

The following examples are given by way of illustration to further disclose the invention.

Example I 75 grams of sebacic acid were passed in the liquid phase in contact with 95.6 grams of pelleted "activated" alumina catalyst for a period of 3 hours at 240°–260° C. The product was found to contain 57 per cent anhydride.

Example II 25 grams of methyl stearate in the liquid phase were contacted with 25 grams of "activated" alumina catalyst for 5¾ hours at 265°–270° C. The product was found to contain 60 per cent anhydride.

Example III

A mixture of 25 grams of methyl stearate and 25 grams of methyl laurate in the liquid phase was contacted with 100 grams of "activated" alumina catalyst for 5½ hours at 270° C. The product was found to contain 98 per cent anhydride.

Example IV

A mixture of 50 grams of stearic acid and 50 grams of methyl stearate was contacted in the liquid phase with 100 grams of "activated" alumina catalyst for a period of 4 hours at 270° C. The product was found to contain 36 per cent anhydride.

Example V 150 grams of caprylic acid were passed in the liquid phase in contact with 150 grams of "activated" alumina catalyst for a period of 4 hours at 270°–275° C. The product was found to consist of a major portion of the anhydride.

Example VI 25 grams of methyl laurate in the liquid phase were heated in contact with 50 grams of "activated" alumina catalyst for a period of 4½ hours at 275° C. in a pressure bomb. The product contained 21.4 per cent anhydride.

Example VII 50 grams of a mixture of hydrogenated marine fatty acids were contacted with 65 grams of "activated" alumina for 4½ hours at 265° C. The product contained 71.5 per cent of the anhydride.

Example VIII 908 grams of lauric acid were passed slowly through a column containing 10 pounds of "activated" alumina. The column was maintained at a temperature of 290° C. A conversion to lauric anhydride of 49 per cent was obtained.

Example IX 908 grams of lauric acid were placed in a column under the conditions of Example VIII, with the exception that contact with the catalyst was maintained for a period of 2 hours. The conversion to anhydride was 70 per cent.

Example X 300 grams of commercial stearic acid were contacted with 350 grams of "activated" alumina catalyst for 2 hours at 270° C. The conversion was to 50 per cent anhydride.

Example XI 300 grams of commercial stearic acid were contacted with 600 grams of "activated" alumina for a period of 2 hours at 270° C. The yield was 69 per cent anhydride.

Example XII

An identical test to that of Example X was conducted, increasing the time of contact with the catalyst to 4 hours. A conversion to anhydride of 70 per cent was obtained.

Example XIII 200 grams of commercial stearic acid were contacted for a period of 9 hours with 400 grams of "activated" alumina at 160° C. The product consisted of 74 per cent anhydride.

Example XIV

Stearic acid was contacted with an excess of "activated" alumina catalyst at varying temperatures and times to illustrate the variation in yield of anhydride obtained:

| Temperature, ° C. | Time, hours | Percent Anhydride |
|---|---|---|
| 145 | 15 | none |
| 160 | 2 | 5 |
| 160 | 9 | 74 |
| 160 | 4 | 37 |
| 190 | 8 | 50 |
| 190 | 2 | 19 |
| 200 | 5 | 60 |
| 200 | 5 | 75 |
| 250 | 2 | 50 |
| 270 | 4 | 70 |
| 270 | 1 | 34 |
| 290 | 2 | 60 |

A necessary condition imposed on the acids used in this process is that they have a critical temperature in excess of 150° C. This, of course, is necessary in order that the acids will remain in the liquid phase during contact with the "activated" alumina catalyst at the operating temperatures of the process. The operating temperature, although opimum for most of the acids at 240°–275° C., must be adjusted so as to be at least a degree or two below the critical temperatures of the acids being processed.

The present invention has the advantage of producing improved results particularly in the yields of anhydride. Also the catalyst provided herein is easily regenerated, thereby simplifying the operation of the process.

Obviously, many modifications and variations of the invention as hereinbefore set forth may be made without departing from the spirit and scope thereof, and therefore only such limitations should be imposed as are indicated in the appended claims.

We claim:

1. A process for the manufacture of acid anhydrides which comprises contacting a reactant having a critical temperature above 150° C. selected from the group consisting of fatty acids having at least 3 carbon atoms, dicarboxylic acids, the methyl and ethyl esters of such acids, and mixtures thereof, with an "activated" alumina catalyst at a temperature below 300° C. and between 150° C. and the critical temperature of said reactant within a zone maintained at sufficient pressure to keep the reactant in the liquid phase during its contact with said catalyst.

2. A process for the manufacture of acid anhydrides which comprises heating a reactant having a critical temperature greater than 150° C. selected from the group consisting of fatty acids having at least 3 carbon atoms, dicarboxylic acids, the methyl and ethyl esters of such acids, and mixtures thereof, in the liquid phase in contact with an "activated" alumina catalyst at a temperature below 300° C. and between 150° C. and the critical temperature of said reactant.

3. A process for the manufacture of acid anhydrides which comprises heating a reactant having a critical temperature greater than 150° C. selected from the group consisting of fatty acids having at least 3 carbon atoms, dicarboxylic acids, the methyl and ethyl esters of such acids, and mixtures thereof, in the liquid phase in contact with an "activated" alumina catalyst at a temperature within the range 150° C. to 300° C.

4. A process for the manufacture of acid anhydrides which comprises contacting a fatty acid having at least 3 carbon atoms and a critical temperature greater than 150° C. with an "activated" alumina catalyst at a temperature below 300° C. and between 150° C. and the critical temperature of said acid within a zone maintained under sufficient pressure to keep said acid in the liquid phase during its contact with said catalyst.

5. A process for the manufacture of acid anhydrides which comprises heating a fatty acid having at least 3 carbon atoms and a critical temperature greater than 150° C. in the liquid phase in contact with an "activated" alumina catalyst at a temperature below 300° C. and between 150° C. and the critical temperature of said acid.

6. A process for the manufacture of acid anhydrides which comprises contacting a fatty acid having at least 3 carbon atoms and a critical temperature greater than 150° C. in the liquid phase with an "activated" alumina catalyst at a temperature within the range 150°–300° C.

7. A process for the manufacture of acid anhydrides which comprises contacting a dicarboxylic acid having a critical temperature greater than 150° C. with an "activated" alumina catalyst at a temperature below 300° C. and between 150° C. and the critical temperature of said acid within a zone maintained under sufficient pressure to keep said acid in the liquid phase during its contact with said catalyst.

8. A process for the manufacture of acid anhydrides which comprises heating a dicarboxylic acid having a critical temperature greater than 150° C. in the liquid phase in contact with an "activated" alumina catalyst at a temperature below 300° C. and between 150° C. and the critical temperature of said acid.

9. A process for the manufacture of acid anhydrides which comprises contacting a dicarboxylic acid having a critical temperature greater than 150° C. with an "activated" alumina catalyst in the liquid phase at a temperature within the range 150°–300° C.

10. A process for the manufacture of acid anhydrides which comprises heating a fatty acid having at least 3 and less than 12 carbon atoms and a critical temperature greater than 150° C. in contact with an "activated" alumina catalyst at a temperature below 300° C. and between 150° C and the critical temperature of said acid under super-atmospheric pressure sufficient to maintain said acid in a liquid phase.

References Cited in the file of this patent

UNITED STATES PATENTS 2,591,493    Arnold et al. _____ Apr. 1, 1952